United States Patent [19]

Cornelison, Jr. et al.

[11] 3,756,339

[45] Sept. 4, 1973

[54] SAFETY BELT CONTROL APPARATUS

[76] Inventors: Floyd S. Cornelison, Jr.; Robert L. Turner, both of 244 S. 9th St., Philadelphia, Pa. 19107

[22] Filed: Mar. 13, 1972

[21] Appl. No.: 234,116

Related U.S. Application Data

[63] Continuation-in-part of Ser. No. 233,090, March 9, 1972, abandoned.

[52] U.S. Cl. .......................... 180/82 C, 242/107 SB
[51] Int. Cl. ............................................. B60r 21/10
[58] Field of Search .................... 180/82 C, 82; 280/150 B; 297/388, 385, 386, 389; 242/107 SB

[56] References Cited
UNITED STATES PATENTS

| | | | |
|---|---|---|---|
| 2,880,789 | 4/1959 | Leibinger | 180/82 C |
| 3,363,712 | 1/1968 | Fontaine | 242/107 SB |
| 3,449,714 | 6/1969 | Farley, Jr. | 180/82 C |
| 3,484,134 | 12/1969 | Townsend | 297/386 |
| 3,624,601 | 11/1971 | Routzahn | 180/82 C |

FOREIGN PATENTS OR APPLICATIONS 237,466   2/1962   Australia .................... 180/82 C Primary Examiner—Kenneth H. Betts
Assistant Examiner—J. M. McCormack
Attorney—Zachary T. Wobensmith II

[57] ABSTRACT

Safety seat belt control apparatus is disclosed in which ends of the belt sections are carried on spring impelled retracting drums, the drums being normally locked against movement but provided with releasing solenoids. The solenoids are controlled by pushbuttons carried by each of the buckle portions on the free ends of the belt sections. An additional switch is provided for completing a circuit when the buckle portions are engaged so that upon movement of any of the pushbuttons the drums are freed so that the length of the connected belt sections can be adjusted as desired and the buckle portions moved as desired, the belt then being locked upon release of the pushbutton. Manual engagement of the buckle portions can be effected with one hand by reason of the control of the available length of each belt section.

9 Claims, 9 Drawing Figures

PATENTED SEP 4 1973

PATENTED SEP 4 1973 3,756,339

SAFETY BELT CONTROL APPARATUS

CROSS REFERENCE TO RELATED APPLICATION

This application is a continuation in part of our prior application filed Mar. 9, 1972, Ser. No. 233,090, now abandoned.

BACKGROUND OF THE INVENTION

1. Field of the Invention

This invention relates to safety belt control apparatus and more particularly to seat belt control apparatus which facilitates buckle coupling and positioning of the belt and the buckle when coupled.

2. DESCRIPTION OF THE PRIOR ART

It has heretofore been proposed to provide spring reel retracted seat belts.

The U.S. Pat. to Board, et al., No. 3,266,842, shows a retractable safety belt which is freely retractable and extensible until the locking tongue on the belt end engages in a fixedly positioned belt fastener whereupon further extension of the belt is automatically prevented by locking the belt at the position it occupies when the belt fastener is engaged.

The U.S. Pat. to Fontaine, No. 3,294,446, shows controlling apparatus for vehicle seat belts having a spring retracted belt reel or roller from which the belt can be pulled outwardly to engage a companion belt section. The belt reel has electrically controlled locking means controlled by a pushbutton located on the floor area or upon the instrument panel. The pushbutton is operated, after the belt has been extended to the desired extent, for a half turn locking movement to lock the belt. For release, the pushbutton is again operated for a half turn unlocking movement to permit the belt to be retracted.

The U.S. Pat. to Fontaine, No. 3,294,339, shows a seat belt and locking means controlled by a switch 7 on the instrument panel. A drum or roller, spring retracted, for one end of the belt is normally locked, after a predetermined time interval allowed for belt extension and remains locked against further extension or retraction until freed by operation of the pushbutton. It is suggested as an alternative that two units can be installed for each passenger and the buckle could then be moved to any position desired.

Haas, U.S. Pat. No. 3,172,200, shows a retractable seat belt in which the belt is locked at both ends upon completion of a circuit by latching the ends of the belts together by the buckle.

Carter, U.S. Pat. No. 3,308,902, and Settimi, U.S. Pat. No. 3,550,875, also show solenoids for controlling the lcoking of seat belt reels.

None of the foregoing show apparatus having the ease of use or the versatility of control of the apparatus of the present invention.

SUMMARY OF THE INVENTION

In accordance with the invention safety belt control apparatus is provided which permits the user to attach the seat belt buckle, using one hand so that the other hand is not required, which effects retraction or extension of the buckled belt using only one hand, which provides for retraction for each side of the seat belt whether buckled or unbuckled and for this purpose independently operable switches on each buckle portion are provided so connected, including a contact in the buckle, that the desired control is effected. Unbuckling is effected by conventional action.

BRIEF DESCRIPTION OF THE DRAWINGS

The nature and characteristic features of the invention will be more readily understood from the following description taken in connection with the accompanying drawings forming part hereof, in which.

Figure 1:
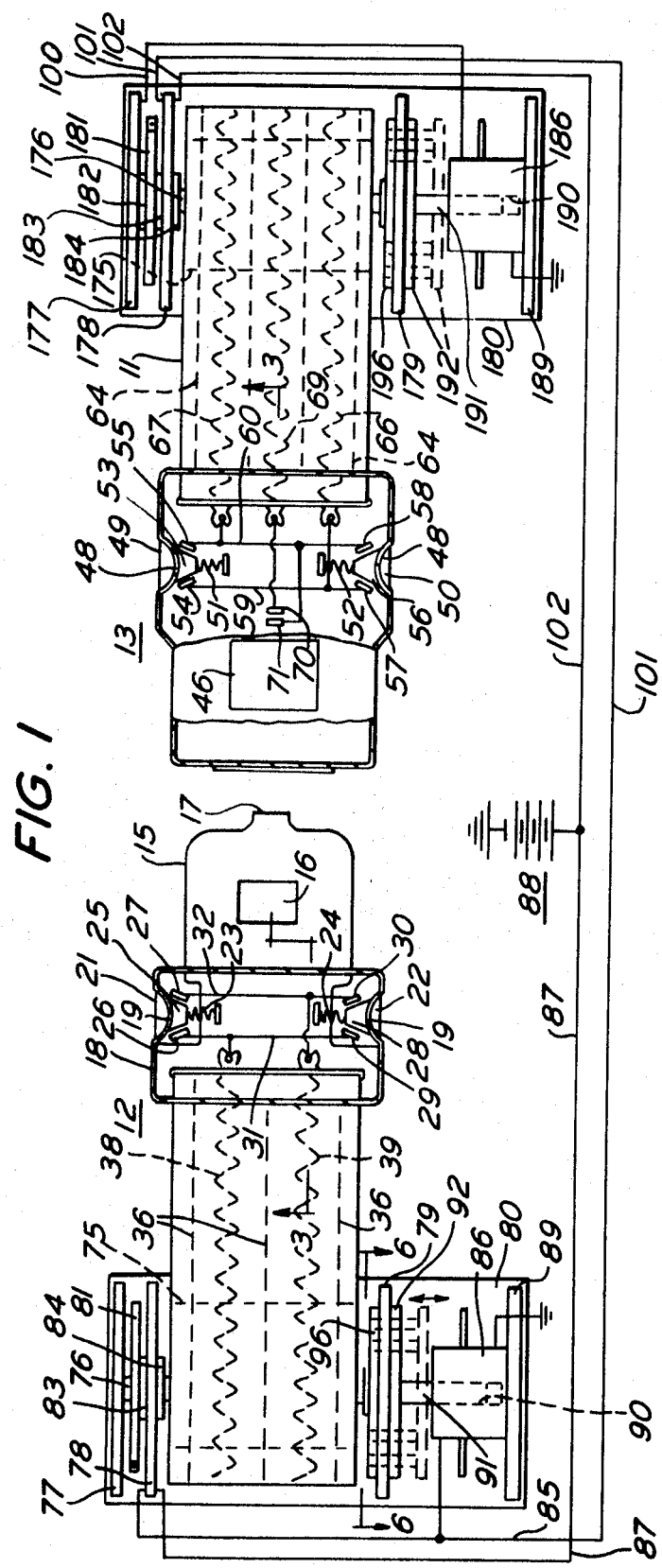
FIG. 1 is a view partly in section and partly diagrammatic showing seat belt control apparatus in accordance with the invention.
Figure 3:
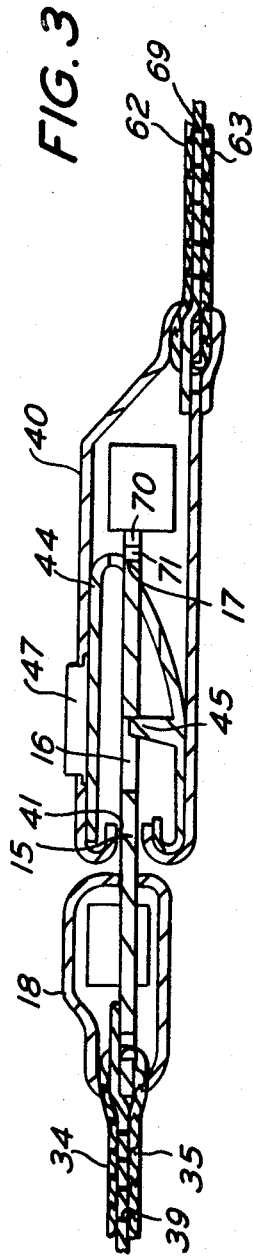
FIG. 3 is a longitudinal sectional view through the belt buckle portions in latched condition and taken approximately on the line 3—3 of FIG. 1.
Figure 2:
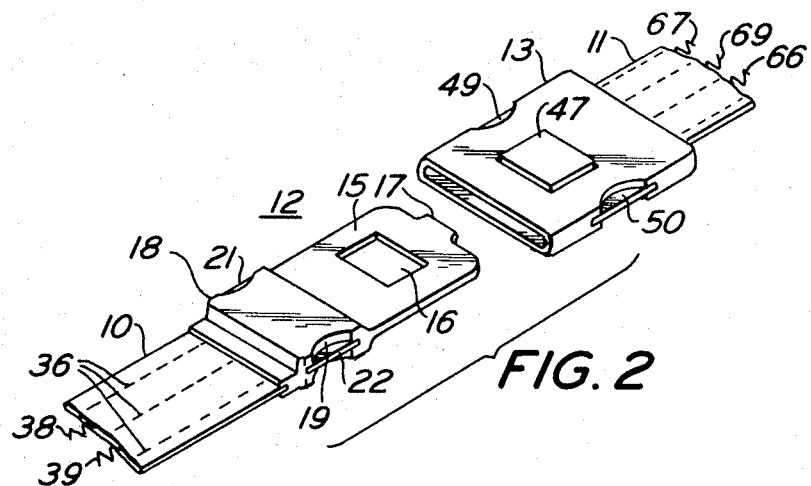
FIG. 2 is a view in perspective of the belt buckle portions in separated condition.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to the drawings, safety belt sections 10 and 11 are illustrated, which may be seat-belt sections, the belt section 10 having a belt buckle portion 12 secured on its free end for engagement with a detachable complemental buckle portion 13 secured on the free end of the belt section 11.

For purposes of illustration the buckle portion 12 is shown as including a plate 15 having a central latching opening 16 and an end projection 17. The plate 15 is carried within a holder !8, preferably electrically insulated or of electrical insulating material such as glass fiber reinforced synthetic plastic material. The holder 18, at opposite sides thereof, has sockets 19 within which exteriorly accessible easily manually movable switch operating slide buttons 21 and 22 are carried. The buttons 21 and 22 are normally urged outwardly to their accessible positions by springs 23 and 24.

The switch operating button 21 has an electrically conductive portion 25 for engagement, upon inward movement of the button 21, with spaced contacts 26 and 27.

The switch operating button 22 has an electrically conductive portion 28 for engagement, upon inward movement of the button 22, with spaced contacts 29 and 30.

The contacts 26 and 29 are preferably connected by a conductor 31 and the contacts 27 and 30 are preferably connected by a conductor 32.

The safety belt section 10 has one end thereof extending within and retained in place within the holder 18. The belt section 10 can be of any desired material but is preferably of two plies of webbing 34 and 35 secured together in any desired manner such as by spaced lines of stitching 36.

Interposed between the plies 34 and 35 and between the lines of stitching 36, insulated electrical conductors 38 and 39 are provided, preferably enclosed within suitable silicon cement which tends to hold the plies 34 and 35 together. The conductors 38 and 39 are preferably undulating or zig zag in shape so that upon concave or convex flexing the conductors 38 and 39 remain free from bending stress which might in time cause failure.

The conductor 31 is electrically connected to the conductor 38 and the conductor 32 is electrically connected to the conductor 39.

The buckle portion 13, for the reception of the plate 15, is shown as including a holder 40 with an end slot 41 for introduction of the plate 15, and a spring lock 44 having a locking tongue 45 for engagement in the opening 16. The buckle portion 13 has an opening 46 for movement of a manually accessible release button 47 for moving the spring lock 44 and the locking tongue 45 thereof to releasing position with the tongue 45 out of engagement in the opening 16, and so that the belt buckle portions 12 and 13 can be separated.

The holder 40 is preferably electrically insulated or of electrical insulating material, such as glass fiber reinforced synthetic plastic material and, at opposite sides thereof, has sockets 48 within which exteriorly accessible easily manually movable switch operating slide buttons 49 and 50 are carried. The buttons 49 and 50 are movably urged outwardly to their accessible positions by springs 51 and 52.

The switch operating button 49 has an electrically conductive portion 53 for engagement, upon inward movement of button 49, with spaced contacts 54 and 55.

The switch operating button 50 has an electrically conductive portion 56 for engagement, upon inward movement of the button 50, with spaced contacts 57 and 58.

The contacts 54 and 57 are preferably connected by a conductor 59 and the contacts 55 and 58 are preferably connected by a conductor 60.

The safety belt section 11 has one end thereof extending within and retained in place within the holder 40. The belt section 11 is preferably similar in construction to the belt section 10, with two plies of webbing 62 and 63 secured together by separated lines of stitches 64.

Interposed between the plies 62 and 63, and between the lines of stitches 64, insulated electrical conductors 66 and 67 are provided. The conductors 66 and 67 are preferably undulating or zig zag in shape as before and the conductors 59 and 60 are respectively connected thereto.

An additional conductor 69 is provided within the belt section 11, similar to the other belt enclosed conductors, and is connected to a spring contact 70 within the holder 40 which is adapted for engagement by a similar spring contact 71 when urged by the end projection 17 with the buckle sections 12 and 13 in latched engagement. The contact 71 is connected by a conductor 72 to the conductor 60.

The belt section 10, at the end opposite to buckle portion 12 is secured to and carried on a drum 75 engaged on a shaft 76. The shaft 76 is journaled in frame plates 77, 78 and 79 which are secured to a base plate 80.

Interposed between the frame plates 77 and 78, a coil spring 81 is provided secured at one end to the base plate 80 and at the other end to the shaft 76 for rotating the drum 75 to wind the belt section 10 thereon for retraction and storage.

The frame plate 78 has insulated commutator discs 83 and 84 secured to the shaft 76 on opposite sides thereof.

The disc 83 has a conductive portion facing one side of the plate 78 which is electrically connected to the conductor 38 and the disc 84 has a conductive portion facing the other side plate 78 which is electrically connected to the conductor 39.

A conductor 85 for wiping engagement at one end by the conductive portion of the commutator disc 83 extends to one terminal of a solenoid 86, and a conductor 87 for wiping engagement at one end by the conductive portion of the commutator disc 84 extends to one terminal of a source 88 of electrical energy such as the car battery, the other terminal of which is connected to ground.

The solenoid 86 is secured to a frame plate 89 on the base plate 80 and has a central opening 90 for an armature 91. The armature 91 has a clutch disc 92 secured thereto with a plurality of clutch pins 93 extending therefrom, guided in openings 94 in the frame plate 79 on the base plate 80, for engagement in clutch pin openings 95 in a clutch disc 96 on the opposite side of the frame plate 79 upon movement thereof in the direction for locking. The clutch disc 96 is secured to the shaft 76. The free ends of the clutch pins 93 are rounded to facilitate their movement into the openings 94.

The belt section 11, at the end opposite to buckle portion 13, is secured to and carried on a drum, 175 secured to a shaft 176. The shaft 176 is journaled in frame plates 177, 178 and 179, which are secured to a base plate 180.

Interposed between the frame plates 177 and 178, a coil spring 181 is provided secured at one end to the base plate 180 and at the other end to the shaft 176 for rotating the drum 175 to wind the belt section 11 thereon for retraction and storage.

The frame plate 177 has an insulated commutator disc 182 on shaft 176 engaging one face thereof and the frame plate 178 has commutator discs 183 and 184 on opposite sides thereof engaging its faces.

The disc 182 has a conductive portion facing the frame plate 177 which is electrically connected to the conductor 67, the disc 183 has a conductive portion facing one side of the frame plate 178 which is electrically connected to the conductor 69, and the disc 184 has a conductive portion facing the other side plate 178 which is electrically connected to the conductor 66.

A conductor 100 for wiping engagement at one end by the conductive portion of the commutator disc 182 extends to one terminal of a solenoid 186 the other terminal of the solenoid 186 being connected to ground. A conductor 101 for wiping engagement at one end by the conductive portion of the commutator disc 183 extends to the opposite terminal of solenoid 86 from that to which conductor 85 extends. A conductor 102 for wiping engagement at one end by the conductive portion of the commutator disc 184 extends to the source 88.

The solenoid 186 is secured to a frame plate 189 on the base plate 180 and has a central opening 190 for an armature 191. The armature 191 is similar to the armature 91, has a clutch disc 192 secured thereto with a plurality of clutch pins 193 extending therefrom, guided in openings 194 in the frame plate 179 on the base plate 180, for engagement in clutch pin openings 195 in a clutch disc 196 on the opposite side of the frame plate 179 upon movement thereof in the direction for locking.

The clutch disc 196 is secured to the shaft 176.

The free ends of the clutch pins 193 are rounded to facilitate their movement into the openings 194.

Figure 4:
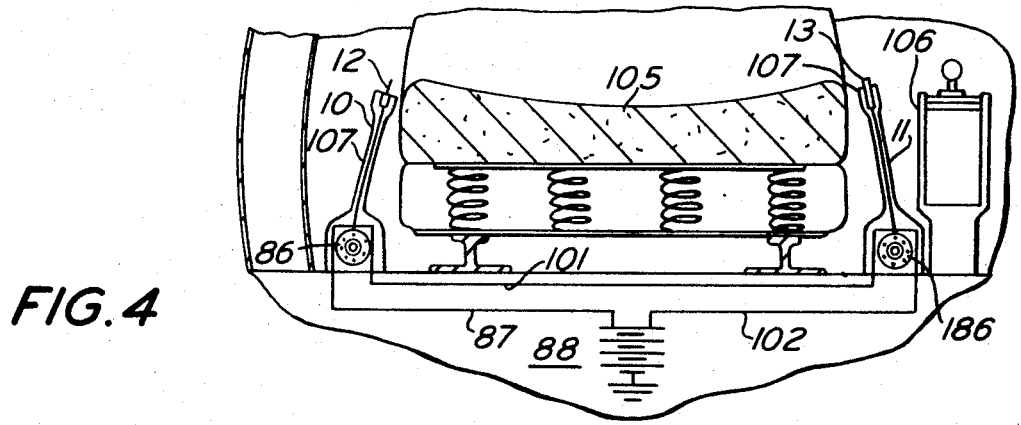
FIG. 4 is a transverse vertical sectional view through a vehicle having bucket seats and showing the location of part of the apparatus of the present invention.

Referring now to FIG. 4, one specific type of installation is there illustrated in connection with a bucket seat 105 having a console 106 at one side thereof.

Holsters 107 for the belt sections 10 and 11 and buckle portions 12 and 13 are provided, mounted on the floor of the vehicle and with the solenoids 86 and 186, the drums 75 and 175 and associated structure enclosed in the lower part of the holsters 107.

Figure 5:
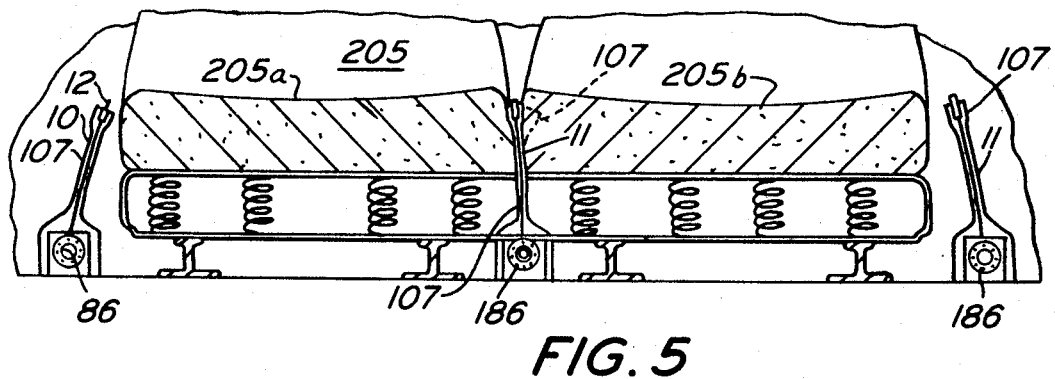
FIG. 5 is a view similar to FIG. 4 but showing a different form of passenger seat with the invention applied thereto.
Figure 6:
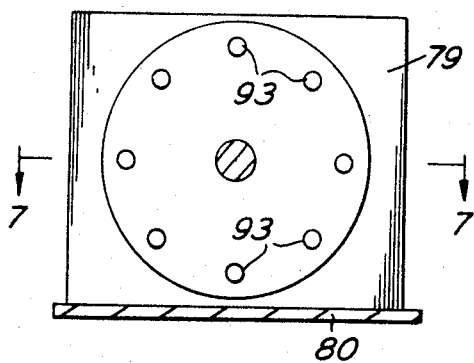
FIG. 6 is a vertical sectional view, enlarged, taken approximately on the line 6—6 of FIG. 1.
Figure 7:
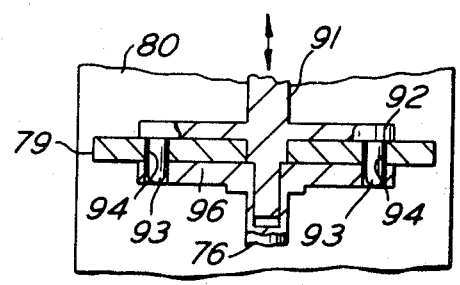
FIG. 7 is a horizontal sectional view taken approximately on the line 7—7 of FIG. 6.
Figure 8:
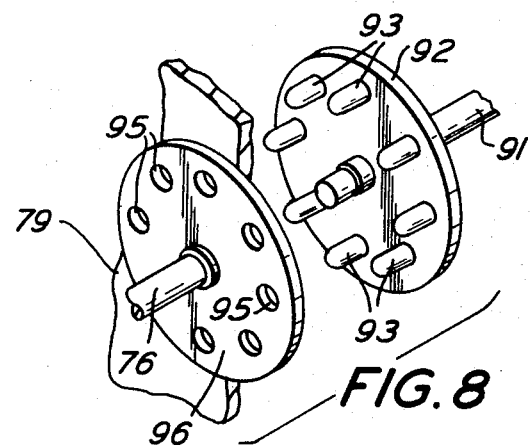
FIG. 8 is an exploded perspective view of the structure shown in FIG. 6 and 7.

In FIG. 5 a bench type seat 205 is shown with two cushions 205a and 205b, and with a pair of holsters 107 for each cushion with the solenoids 86 and 186, drums 75 and 175 and associates structure enclosed in each pair of holsters 107 as in FIG. 4.

Figure 9:
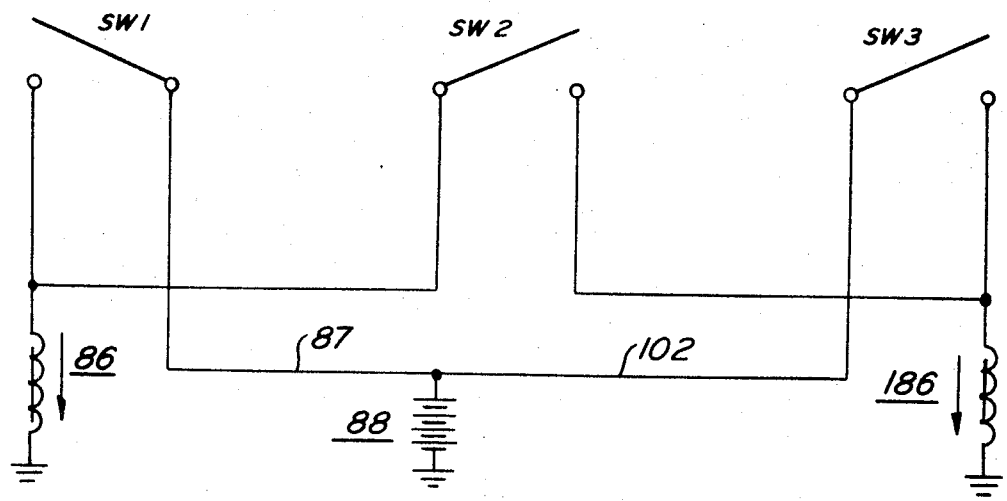
FIG. 9 is a generalized wiring diagram of the apparatus of the invention.

In FIG. 9, a simplified wiring diagram is illustrated in which switch SW1 corresponds to the contacts 26, 27 and slide button 21, and contacts 29, 30 and slide button 22. The switch SW2 corresponds to the contacts 70, 71 and their actuating projection 17. The switch SW3 corresponds to the contacts 54, 55 and slide button 49 and contacts 51 and 58 and slide button 50.

The mode of operation will now be pointed out.

When the user desires to use the seat belt, and assuming that the belt sections 10 and 11 have previously been retracted, the buckle portions 12 and 13 are grasped and the buttons 21 and/or 22 (SW1) and 49 and/or 50 (SW3) are pressed depending on which hand or hands of the user are employed.

The circuit completed by pressing the buttons 21 and/or 22 (SW1) causes the solenoid 86 to be energized and to retract the clutch disc 92 thereby disengaging the pins 93 from the openings 95 in the disc 96 and unlocking the drum 75. So long as this circuit is maintained energized the belt section 10 can be drawn from or returned to the drum 75 to the desired extent. Upon deenergization of the solenoid 75 the clutch disc 92 will again advance the locking pins 93 to a position to engage in the openings 95 and lock the drum 76 as positioned at that time.

In a similar manner the belt section 11 can be released from locking by the clutch disc 192 upon pressing and holding the buttons 49 and/or 50 (SW3) and the belt section 11 can be drawn from or returned to the drum 175 to the desired extent. Upon release of the buttons 49 and/or 50 (SW3) the drum 175 will again be locked with the belt section 11 extended to the desired extent.

With the belt sections 10 and 11 having their buckle portions 12 and 13 accessible, either buckle section can be engaged with the other using only one hand since by pressing the buttons on either buckle portion 12 or 13 and releasing the drum 75 or 175 the corresponding belt section 10 or 11 can be readily manually lengthened or shortened.

Upon engagement of the buckle portions 12 and 13, and with the locking tongue 45 engaged in the latching opening 16 the end projection 17 closes the contacts 70, 71 (SW2). A circuit is thus made available so that upon pressing the buttons 21 and/or 22 (SW1) or 49 and/or 50 (SW3) both solenoids 86 and 186 are energized to unlock both drums 75 and 175. This is shown diagramatically in FIG. 9.

When both drums 75 and 175 are free the connected belt sections 10 and 11 can be moved toward or away from the body of the user, or the latched buckle portions 12 and 13 can be moved to the left or to the right to the desired location for comfort. Upon release of the button or buttons which had been pressed to make the adjustment, the release of the solenoids 86 and 186 will then effect locking of the drums 75 and 175 at the selected adjusted position of the connected belt sections.

The buckle portions 10 and 11 can be readily disconnected if desired, by pressure applied on the release button 47 and separation of the buckle sections.

We claim:

1. Safety belt control apparatus comprising
   a pair of belt sections having free ends with interengaging buckle portions thereon,
   rotatable retracting members to which the other ends of said belt sections are connected,
   locking members for said retracting members, and
   means for controlling said locking members comprising
   switch members on each of said buckle members for controlling the locking member for a corresponding retracting member, and
   an additional control member for simultaneously controlling both said locking members when either of said switch members is operated.

2. Safety belt control apparatus as defined in claim 1 in which
   said switch members comprise a slidable contact controlling button.

3. Safety belt control apparatus as defined in claim 1 in which
   said switch members comprise opposed slidable contact controlling buttons.

4. Safety belt control apparatus as defined in claim 1 in which
   said additional control member includes contacts engaged when said buckle portions are in locked engagement.

5. Safety belt control apparatus as defined in claim 1 in which
   each of said belt sections has a plurality of electrical conductors disposed therein.

6. Safety belt control apparatus as defined in claim 1 in which
   each of said belt sections comprises a pair of plies and has a plurality of spaced insulated conductors between said plies.

7. Safety belt control apparatus as defined in claim 6 in which
   said conductors are of undulating shape for increased flexibility.

8. Safety belt control apparatus as defined in claim 1 in which said locking members comprise reciprocatory members movable into engagement with portions of said retracting members, and solenoids controlled by said last mentioned means.

9. Safety belt control apparatus as defined in claim 8 in which said reciprocatory members comprise a clutch disc held against rotation, said disc has a plurality of pins, and said retracting member has a disc for engagement by said pins.

* * * * *